(12) United States Patent
Lu et al.

(10) Patent No.: US 12,398,307 B2
(45) Date of Patent: *Aug. 26, 2025

(54) METHODS AND SYSTEMS ASSOCIATED WITH IMPROVED ESTIMATED ULTIMATE RECOVERY (EUR) ADDITIVE THROUGH PROPPANT PACKS

(71) Applicant: SCIDEV ENERGY SERVICES, INC., Houston, TX (US)

(72) Inventors: Shawn Lu, Katy, TX (US); Kevin Wilbur Smith, Bellaire, TX (US)

(73) Assignee: SCIDEV ENERGY SERVICES, INC., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/530,459

(22) Filed: Dec. 6, 2023

(65) Prior Publication Data

US 2025/0188341 A1   Jun. 12, 2025

Related U.S. Application Data

(63) Continuation of application No. 17/718,396, filed on Apr. 12, 2022, now Pat. No. 11,884,876.

(60) Provisional application No. 63/173,712, filed on Apr. 12, 2021.

(51) Int. Cl.
*C09K 8/80* (2006.01)
*C09K 8/54* (2006.01)
*E21B 37/06* (2006.01)
*E21B 43/267* (2006.01)

(52) U.S. Cl.
CPC ............... *C09K 8/80* (2013.01); *C09K 8/54* (2013.01); *E21B 37/06* (2013.01); *E21B 43/267* (2013.01)

(58) Field of Classification Search
CPC ........ E21B 43/26; E21B 43/267; E21B 43/25; E21B 37/06; E21B 43/27
See application file for complete search history.

(56) References Cited

U.S. PATENT DOCUMENTS

2015/0068747 A1* 3/2015 Hwang .................. C09K 8/92
166/308.1

* cited by examiner

*Primary Examiner* — Zakiya W Bates
(74) *Attorney, Agent, or Firm* — Pierson IP, PLLC

(57) ABSTRACT

A chemical compositional to be pumped throughout the stimulation job, which includes while pumping proppant. The surfactant within the chemical composition causes the chemistry to adhere to the proppant, and the surfactant should be added into the stimulation job while the proppant is being pumped because the proppant is water-wet and free of any produced oil to decrease the amount of water flowing through the proppant while allowing vicious oil to flow through the proppant.

5 Claims, 5 Drawing Sheets

METHODS AND SYSTEMS ASSOCIATED WITH IMPROVED ESTIMATED ULTIMATE RECOVERY (EUR) ADDITIVE THROUGH PROPPANT PACKS

BACKGROUND INFORMATION

Field of the Disclosure

Examples of the present disclosure relate to systems and methods for a superior EUR additive. More specifically, the EUR additive may improve proppant placements and enhance flow capacity through a proppant pack to maximize the EUR of hydrocarbons from unconventional shale wells.

Background

Production wells penetrate subterranean formations whose yield, besides the desired lighter fluid, such as oil, includes a heavier undesirable fluid, such as water. Over time the percentage of water produced from the formation typically increases. The production of water to the ground surface results in increased costs in both the energy to lift the water to the surface and in surface handling. Accordingly, many wells become uneconomic due to excess water production.

Horizontal drilling combined with massive volumes of water used in fracturing has increased the supply of hydrocarbons, but not without creating other problems. One significant problem is that fracturing not only stimulates hydrocarbon production but can also increase water production. Worldwide for every barrel of oil produced, 4-5 bbls of water are produced. In more extreme cases, the water-oil ratio can even be 20:1 or greater.

Pumps are used to "lift" the fluids to the surface where they can be processed. Lifting water means a bigger pump using more energy than needed for just the oil. Oil, gas, and water are found together in most reservoirs. Limiting the amount of water produced has been an ongoing challenge in oilfield environments.

Additionally, before the paradigm shift to large fracturing volumes in horizontal wells, there was no large-scale production from shale. Currently, shale dominates the production of hydrocarbons, yet there is still much unknown about shale. For example, it is hard to understand how nanodarcy permeability can produce hydrocarbons. Shale is not the same as sandstone or carbonate. Water that imbibes into the shale dissolves cations from the shale and weakens the shale structure. Proppant can then embed into the weakened shale to secure the fractures.

However, proppant embedment lowers fracture conductivity. Another challenge and a pervasive problem associated with shale is iron. Pyrite within the shale contains iron that reacts with water to release iron and sulfate. The iron is oxidized by the fracturing fluid and becomes ferric iron. Ferric iron cross-links polyacrylamide. Water used for fracturing is typically treated to remove iron, but fracturing creates more iron when the fracturing fluid comes in contact with the pyrite in the shale and that iron can cross-link polyacrylamide in the reservoir. Essentially the polyacrylamide flocculates the iron particles.

In other words, iron crosslinked polyacrylamide is detrimental to proppant transport and placement, which is detrimental to proppant transport and placement. In severe cases, a blockage can form that prevents the flow of hydrocarbons.

Accordingly, needs exist for systems and methods associated with a combination of alkylpyridine quaternary with scale inhibitor chemistry and a surfactant that is configured to act as an oxygen corrosion inhibitor that prevents or limits iron flocculation in a reservoir while increasing permeability of hydrocarbons through a proppant pack and decreasing permeability of water through the proppant pack.

SUMMARY

Embodiments are directed towards systems and methods to improve EUR using alkyl pyridine quaternary ammonium chloride (APQ) in combination with a phosphonate scale inhibitor and a surfactant.

APQ may be configured to minimize pyrite corrosion by forming a film on pyrite and forming a film on the proppant. When enhancing the film-forming properties of APQ with a surfactant allows the added benefit of reducing the amount of water that flows through the proppant pack. Mitigating water production improves hydrocarbon production from the well. APQ is cationic and that helps prevent the removal of cations from the shale. Maintaining shale strength reduces proppant embedment.

The phosphonate scale inhibitor may be configured to prevent scale from building up, increasing, etc. on surfaces of steel tubular.

The combination of APQ and the phosphonate scale inhibitor keeps iron dispersed so that it is not flocculated by the polyacrylamide within proppant packs. APQ also adheres to the charged proppant to make a film on the surface of the proppant which is hydrophobic ensuring the polyacrylamide does not adhere to (or flocculate) the proppant. Because the APQ has absorbed onto the proppant, the proppant is less likely to embed into the shale, which may help prevent proppant embedment at the fracture face.

The surfactant may be a substance that is configured to reduce the surface tension of a liquid in which it is dissolved. The surfactant may be configured to reduce the amount of water that flows through the proppant pack, which mitigates water production and improves hydrocarbon production from the reservoir. To this end, combining alkyl pyridine quaternary ammonium chloride corrosion inhibitor and phosphonate scale inhibitor (HFT trade name CatChek 12) with a surfactant can reduce the amount of water that can flow out of the well. Specifically, CatChek 12+a surfactant modifies the relative permeability of the proppant pack to improve the flow of oil while minimizing the flow of water.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention, and the invention includes all such substitutions, modifications, additions, or rearrangements.

BRIEF DESCRIPTION OF THE DRAWINGS

Non-limiting and non-exhaustive embodiments of the present invention are described concerning the following figures, wherein reference numerals refer to like parts throughout the various views unless otherwise specified.

Figure 1:
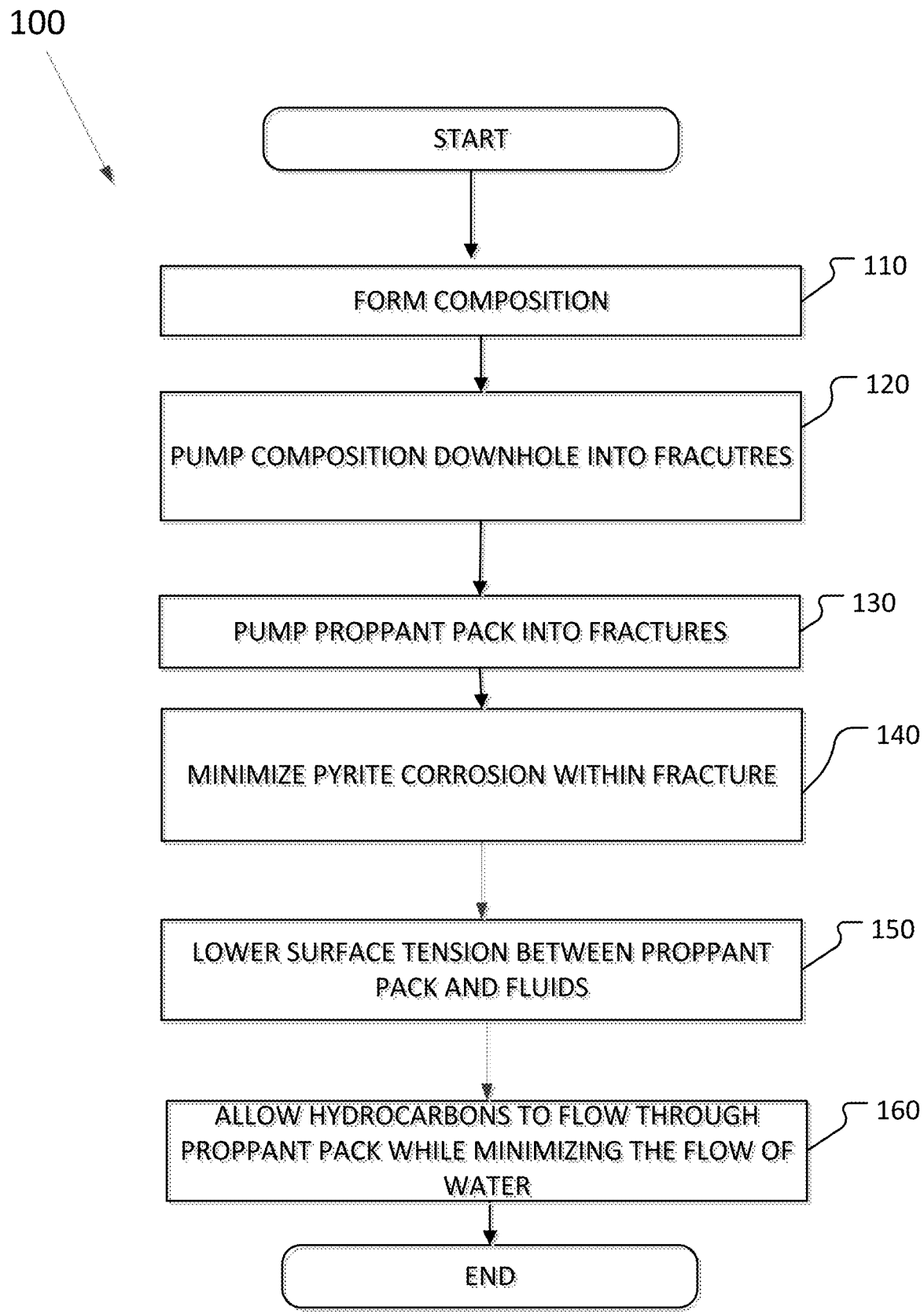
FIG. 1 depicts a method for utilizing a novel composition to minimize pyrite corrosion while mitigating water production and improving hydrocarbon from a well, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted to facilitate a less obstructed view of these various embodiments of the present disclosure.

DETAILED DESCRIPTION

In the following description, numerous specific details are outlined to provide a thorough understanding of the present embodiments. It will be apparent, however, to one having ordinary skill in the art, that the specific detail need not be employed to practice the present embodiments. In other instances, well-known materials or methods have not been described in detail to avoid obscuring the present embodiments.

FIG. 1 depicts method 100 to utilize a novel composition to minimize pyrite corrosion while mitigating water production and improving hydrocarbon from a well. Embodiments described in method 100 allow for a chemical composition to be pumped throughout the stimulation job, which includes pumping proppant. The surfactant within the chemical composition causes the chemistry to adhere to the proppant, and the surfactant should be added to the stimulation job while the proppant is being pumped because the proppant is water-wet and free of any produced oil.

The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 1 and described below is not intended to be limiting.

At operation 110, a composition may be formed. The composition may include an alkyl pyridine quaternary ammonium chloride corrosion inhibitor at 5 to 25% by weight and a phosphonate scale inhibitor at 1 to 10% with a surfactant at 1 to 20%. In embodiments, the alkyl pyridine quaternary ammonium chloride (APQ) may be a reaction product of Lonza Akolidine 10 or similar and benzyl chloride at a 1:1 molar ratio. Additionally, the APQ may be cationic and be configured to prevent the removal of cations from the shale. This may allow the shale to maintain its strength and reduce proppant embedment. The phosphonate scale inhibitor may be diethylenetriamine penta (methylene phosphonic acid) or similar. The surfactant may be a Nonyl Phenol Exthoxylate with 9 moles of ethylene oxide or one with a similar HLB such as a tridecylalcohol exthoxylate with 9 moles of ethylene oxide. In embodiments, the alkyl pyridine quaternary ammonium chloride corrosion inhibitor and phosphonate scale inhibitor may be pumped downhole at a rate of one gallon per estimated thousand gallons pumped throughout the stimulation job. The surfactant may be pumped separately downhole at a rate of 0.1-0.25 gallons per estimated thousand gallons pumped on the stimulation job. Typically stimulation jobs are pumped at 100 BPM. An oilfield barrel is 42 gallons. The chemistry is pumped at 4.2 times the gallons per thousand to equal the gallons per minute.

At operation 120, the composition may be pumped downhole, and be positioned within fractures within a wellbore.

At operation 130, a proppant pack may be pumped downhole and be positioned within the fractures within the wellbore. The proppant pack may be configured to prop open the fracture within the wellbore while being permeable. In embodiments, the proppant pack may have an anionic charge. While the proppant is being positioned within the fractures, friction reduces, such as polyacrylamide, which may assist with placing the proppant in the fractures to evenly distribute the proppant throughout the fracture. In embodiments, the proppant pack is pumped downhole along with the chemical composition. This may allow the chemical composition to adhere to the proppant before the proppant has become contaminated with the oil.

At operation 140, the composition, specifically the APQ and the phosphonate scale inhibitor, within the fracture may minimize pyrite corrosion within the fracture by forming a film on the pyrite and form a film on the proppant within the proppant pack. More specifically, the APQ may adhere to the anionic-charged proppant to make the surface of the proppant hydrophobic ensuring the polyacrylamide does not adhere to (or flocculate) the proppant. Because the APQ has absorbed the proppant, the proppant is less likely to embed into the shale. Because the surface of the proppant is hydrophobic the friction reducers within the proppant pack cannot flocculate the iron particles within the shale.

At operation 150, the surfactant may lower the surface tension between the proppant pack and fluids flowing through the proppant pack. More specifically, the surfactant modifies the relative permeability of the proppant pack to improve the flow of oil while minimizing the flow of water, wherein the flow of water may be in a direction from the fracture towards the surface of the well. In embodiments, the additives may be pumped downhole together with the proppant. As such, the additives may interface with the proppant before the proppant is contaminated with oil, allowing the additives to more effectively adhere to the proppant. In embodiments, the surfactant may allow the chemical composition to adhere to the proppant, wherein the surfactant may be added into the chemical composition during a stimulation job while the proppant is being pumped because the proppant may be water-wet and free of any produced oil.

At operation 160, due to the lower surface tension within the proppant pack hydrocarbons may flow through the proppant pack but water may be restricted from flowing through the proppant pack.

Figure 2:
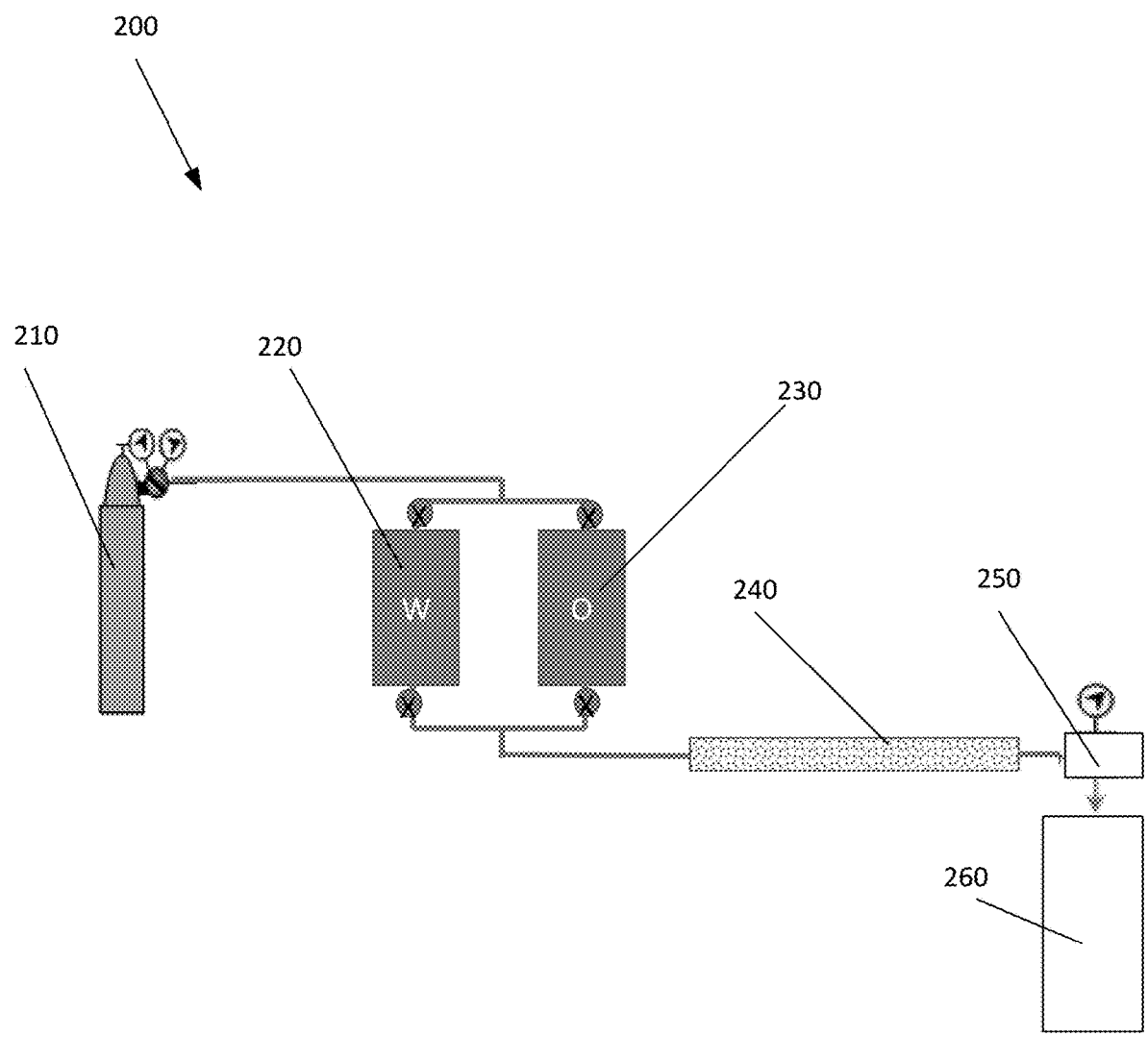
FIG. 2 depicts an apparatus to study the impact of additives on water cut vs production rate, according to an embodiment.

FIG. 2 depicts apparatus 200 to study the impact of additives on water cut vs production rate. Elements depicted in FIG. 2 may be described above, and for the sake of brevity, an additional description of these elements may be omitted. Apparatus 200 may include a pressure regulator 210, water reservoir 220, oil reservoir 230, frac pack 240, valve 250, and testing chamber 260.

Pressure regulator 210 may be configured to produce pressure towards water reservoir 220 and oil reservoir 230, wherein the produced pressure may simulate downhole conditions. In embodiments, pressure regulator 210 may be configured to vary the produced pressure to allow water reservoir 220 and oil reservoir 230 to stimulate fluid flow back conditions. For example, pressure regulator 210 may be configured to allow water reservoir 220 and oil reservoir 230 to operate at a common pressure, with set outlet rates or water reservoir 220 and oil reservoir 230 at 6, 3, and 1.5 cc/min. These rates may correspond to initial well rates of 300 barrels per day (bpd) dropping to 150, 75, and 50 bpd over time.

Water reservoir 220 may be a container, chamber, etc. that is configured to store and hold water. The water stored within Water Reservoir 220 may be similar to that within a fracture downhole. Water Reservoir 220 may include an inlet and an outlet. The inlet may be configured to receive pressure from pressure regulator 210 to control the flow rate of water emitted from the outlet.

Oil reservoir 230 may be a container, chamber, etc. that is configured to store and hold oil. The oil stored within Oil Reservoir 230 may be similar to that within a fracture downhole. Oil Reservoir 230 may include an inlet and an outlet. The inlet may be configured to receive pressure from pressure regulator 210 to control the flow rate of water emitted from the outlet. In embodiments, the flow rate from oil reservoir 230 may be equal to, greater than, or lower than the flow rate emitted from water reservoir 220.

Frac pack 240 may be a fracturing pack loaded in treating fluid. Frac pack 240 may be configured to stimulate a proppant pack positioned within a fracture based on receiving water from water reservoir 220 and oil from oil reservoir 230. Frac pack 240 may be 0.05 by 6 inches in 100 or 40/70 sand. In embodiments, a first frac pack 240 may not include any additives to represent a control group. A second frac pack 240 may include additives, such as an alkyl pyridine quaternary ammonium chloride corrosion inhibitor, and phosphonate scale inhibitor. A third frac pack 240 may include an alkyl pyridine quaternary ammonium chloride corrosion inhibitor and a phosphonate scale inhibitor with a surfactant. Utilizing the first, second, and third frac pack 240, a water cut rate of a horizontal column associated with the frac pack 240 may be determined.

Valve 250 may be in communication with an outlet of frac pack 240 and be configured to control the pressure of the fluid emitted from frac pack 240, such that that a flow rate emitted from valve 250 is between 1 and 6 cc/min.

Testing chamber 260 may be configured to receive the fluid emitted from valve 250 to determine a water cut rate vs. the production rate of the oil and water within the emitted fluid.

Figure 3:
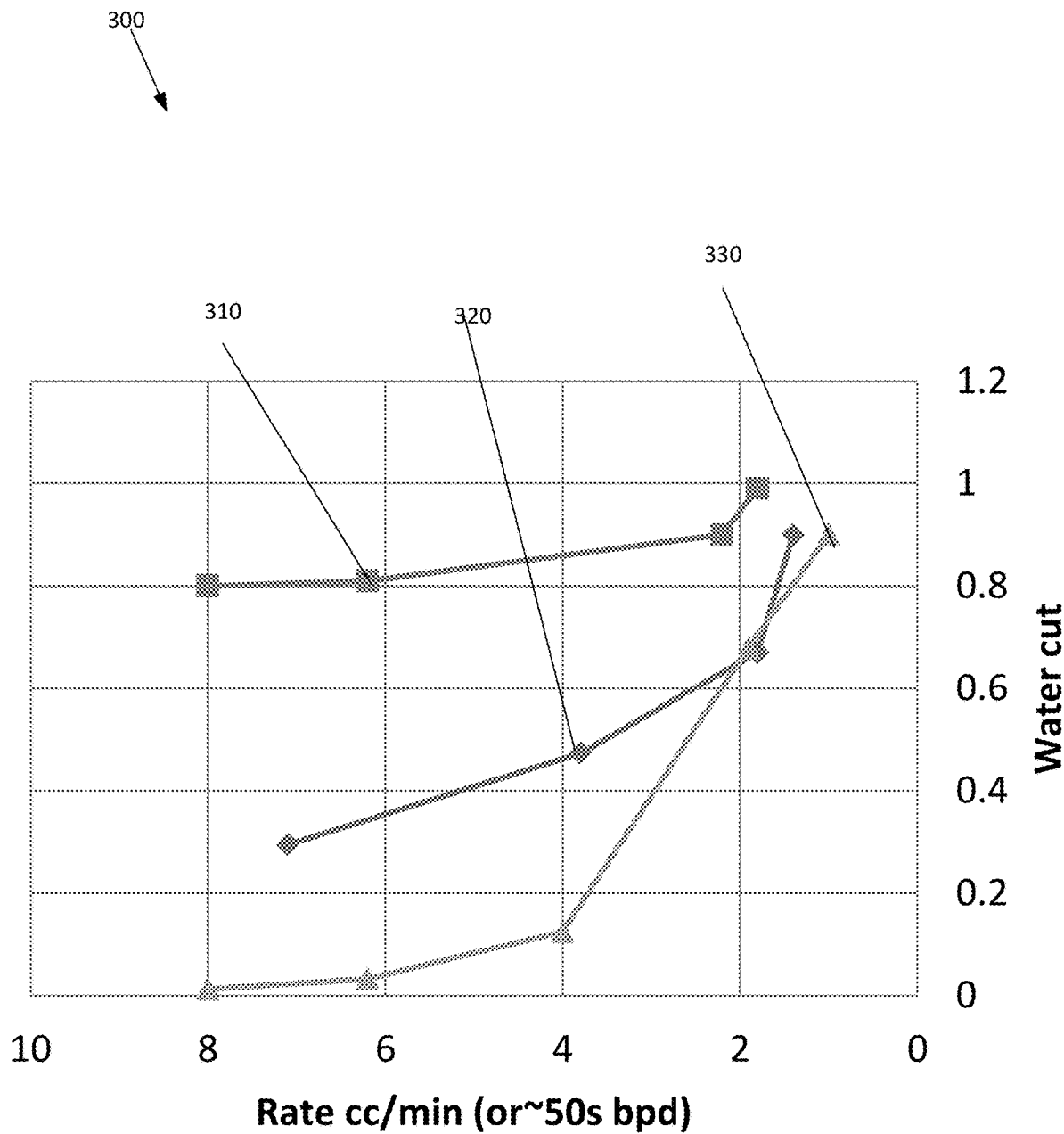
FIG. 3 depicts a graph illustrating the water cut rate for a first proppant pack, a second proppant pack, and a third proppant pack, according to an embodiment.

FIG. 3 depicts graph 300 illustrating the water cut rate for a first proppant pack 310, a second proppant pack 320, and a third proppant pack 330, according to an embodiment. The water cut rate may be determined in testing chamber 260.

First proppant pack 310 may include additives, such as an alkyl pyridine quaternary ammonium chloride corrosion inhibitor, and phosphonate scale inhibitor. The second proppant pack 320 may be a control group with no additives. Third proppant pack 330 may include an alkyl pyridine quaternary ammonium chloride corrosion inhibitor and a phosphonate scale inhibitor with a surfactant.

As depicted in FIG. 3, the first proppant pack 310 may increase the amount of water flowing through it when compared to the second proppant pack 320. Additionally, the third proppant pack 330 may decrease the amount of water flowing through it when compared to the second proppant pack 320. To this end, adding a surfactant to create a third proppant pack assists in water suppression at rates less than 2 cc/min of less than 100 barrels per day production rate.

Figure 4:
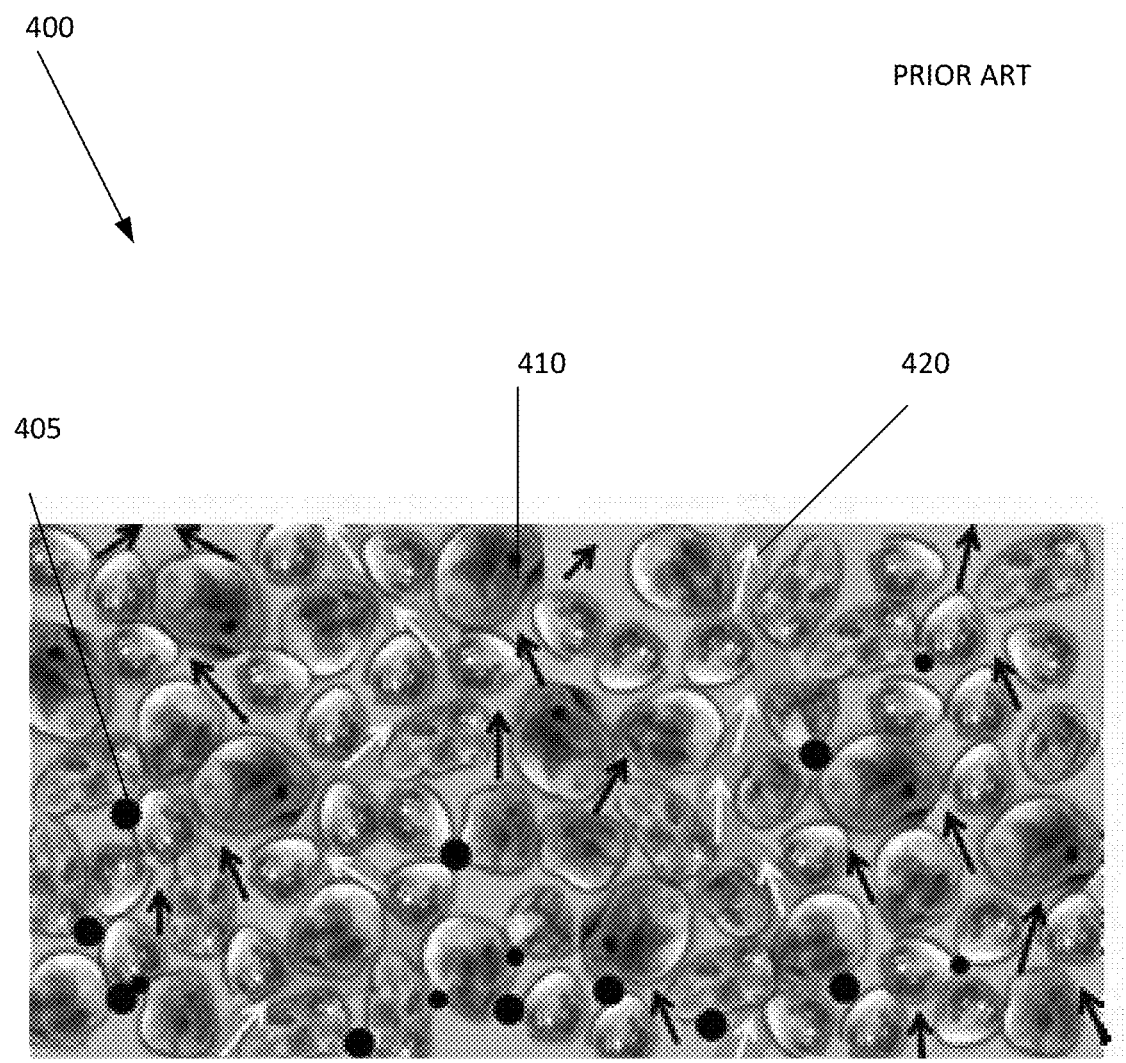
FIG. 4 depicts propped fractures during production.

FIG. 4 depicts a propped fracture during production 400, according to the prior art. As depicted in FIG. 4, when conventional proppant is pumped into a fracture, fine 405 is generated, which is determinate to the subsequent well production. Specifically, oil and gas flow 420 may be required to flow around the generated fine 405, which may reduce the width of channels between proppant 410.

Figure 5:
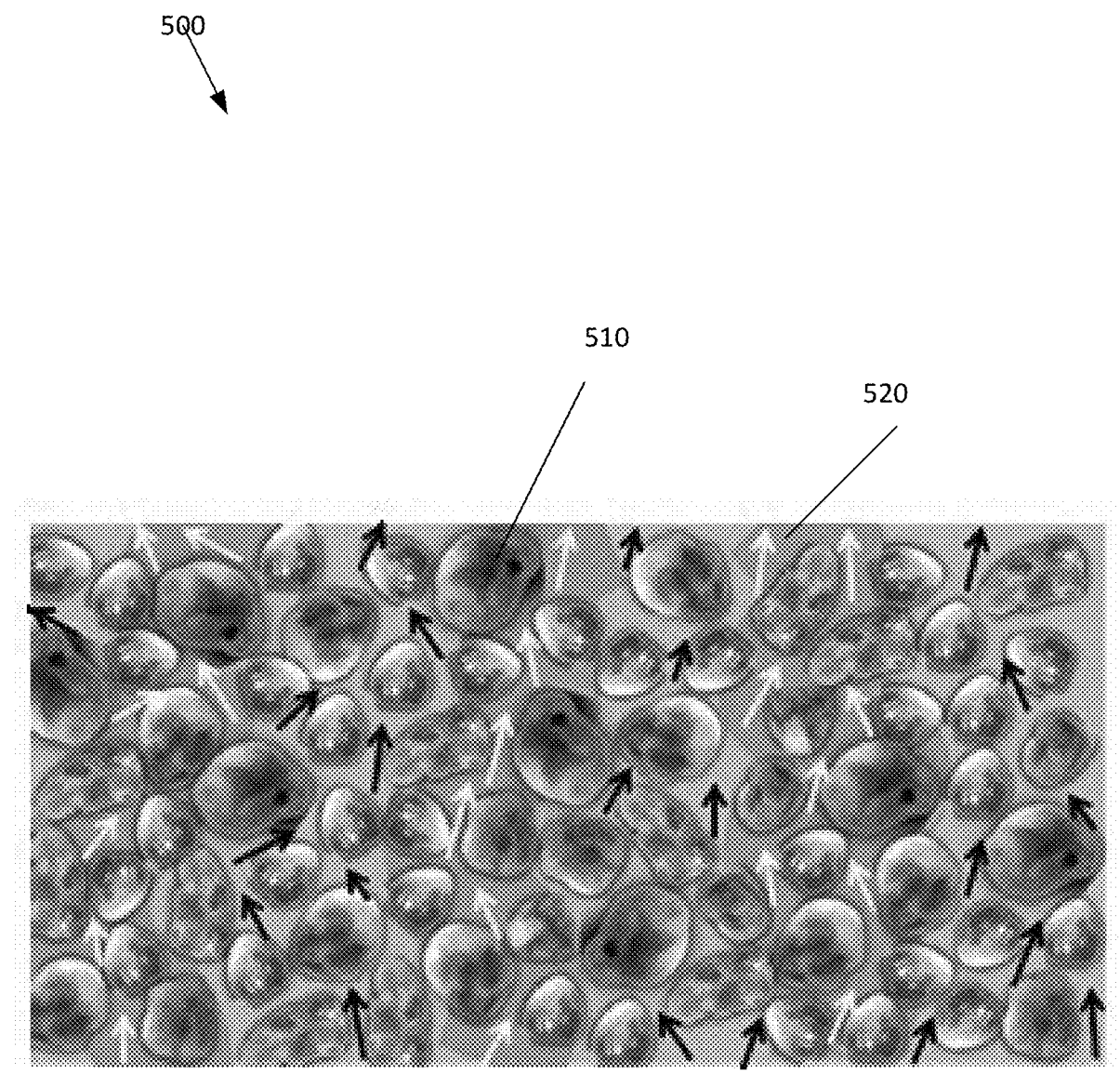
FIG. 5 depicts propped fractures with chemical additives, according to an embodiment.

FIG. 4 depicts a propped fracture during production 500 with additional chemical additives, according to an embodiment. As depicted in FIG. 5, when the proppant is coated with alkyl pyridine quaternary ammonium chloride corrosion inhibitor and phosphonate scale inhibitor with a surfactant, optimal interaction with the proppant and formation of solid surfaces is achieved. Specifically, the chemical additives coat the proppant and form surfactant to stabilize the solids and minimize the fine generation. This helps maintain well pressure, and promotes the flow of hydrocarbons 520 between the proppant 510. More specifically, the chemical additives may minimize the mobility of fines, while maintaining the conductivity of the fractures.

In embodiments, the chemical additives are applicable with various friction reducers that are anionic to cationic. The chemical additives are also compatible with most fracturing additives from flow back surfactants, corrosion and scale inhibitors and biocides.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method associated with a chemical composition for fracturing fluids to increase the estimated ultimate recovery of hydrocarbons from shale, the method comprising:
    pumping the chemical composition within a fracture, the chemical composition including a surfactant and an ammonium chloride corrosion inhibitor, wherein the ammonium chloride corrosion inhibitor is alkyl pyridine quaternary ammonium chloride, wherein the ammonium chloride corrosion inhibitor is cationic;
    pumping a proppant pack within the fracture, the proppant pack including an anionic charged proppant;
    forming a film on the proppant pack by absorbing the corrosion inhibitor into the proppant to cause the proppant pack to be hydrophobic and to prevent proppant embedment at a fracture face;

changing the relative permeability of the proppant pack to reduce the amount of water flowing through the proppant pack while allowing viscous oil to flow through the proppant pack, wherein the surfactant lowers the relative permeability of the proppant pack;

reducing a flow of water from a fracture toward a surface of a well via the proppant pack.

2. The method of claim 1, wherein the surfactant has a concentration of 0.25 GPT to 0.50 GPT.

3. The method of claim 1, further comprising:

forming a film on shale to enhance iron dispersion of the shale.

4. The method of claim 3, further comprises:

dispersing iron to prevent iron flocculation of the shale.

5. The method of claim 1, further comprising:

preventing proppant embedment at a fracture face.

* * * * *